(12) United States Patent
Wei et al.

(10) Patent No.: US 10,491,033 B2
(45) Date of Patent: Nov. 26, 2019

(54) METHOD FOR HOT-PLUGGING, CONTROL DEVICE FOR HOT-PLUGGING, METHOD AND DEVICE FOR VOLTAGE BALANCE

(71) Applicant: Contemporary Amperex Technology Co., Limited, Ningde, Fujian (CN)

(72) Inventors: Zhili Wei, Ningde (CN); Zhipeng Hu, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 0 days.

(21) Appl. No.: 15/720,189

(22) Filed: Sep. 29, 2017

(65) Prior Publication Data
US 2018/0109133 A1 Apr. 19, 2018

(30) Foreign Application Priority Data

Oct. 14, 2016 (CN) .......................... 2016 1 0895643

(51) Int. Cl.
*G08B 21/00* (2006.01)
*H02J 9/00* (2006.01)
(Continued)

(52) U.S. Cl.
CPC .............. *H02J 9/002* (2013.01); *H02J 1/108* (2013.01); *H02J 7/007* (2013.01); *H02J 7/0014* (2013.01);
(Continued)

(58) Field of Classification Search
CPC ........ H02J 1/108; H02J 7/0014; H02J 7/0021; H02J 7/0026; H02J 7/0047; H02J 7/0054;
(Continued)

(56) References Cited

U.S. PATENT DOCUMENTS 6,174,617 B1 * 1/2001 Hiratsuka ............. H01M 10/48
429/90
6,531,791 B2 * 3/2003 Ekelund .................... H02J 1/10
307/29
(Continued)

FOREIGN PATENT DOCUMENTS

CN 101295879 A 10/2008
CN 102480142 A 5/2012
(Continued)

OTHER PUBLICATIONS

The Partial European Search Report dated Feb. 13, 2018 for European Application No. 17193872.3, 10 pages.
(Continued)

*Primary Examiner* — Naomi J Small
(74) *Attorney, Agent, or Firm* — Law Offices of Liaoteng Wang (57) ABSTRACT

The embodiments of the present disclosure provide a method for hot-plugging, a control device for hot-plugging, and a method and device for voltage balance. In one aspect, in an embodiment of the present disclosure, when there is a battery unit to be replaced in a plurality of parallel battery units, a branch in which the battery unit to be replaced locates may be cut off. Therefore, the technical solution provided by the embodiments of the present disclosure may solve a contradictory problem between the replacement of the battery unit and the normal operation of the power supply system in the related art and a problem caused thereby that the safety and stability of the power supply system are low.

5 Claims, 2 Drawing Sheets

(51) Int. Cl.
*H02J 7/00* (2006.01)
*H02J 1/10* (2006.01)
*H02J 7/34* (2006.01)

(52) U.S. Cl.
CPC .......... *H02J 7/0021* (2013.01); *H02J 7/0026* (2013.01); *H02J 7/0047* (2013.01); *H02J 7/0054* (2013.01); *H02J 7/0055* (2013.01); *H02J 7/34* (2013.01)

(58) Field of Classification Search
CPC .. H02J 7/0055; H02J 7/007; H02J 7/34; H02J 9/002
USPC .................................................... 340/636.13
See application file for complete search history.

(56) References Cited

U.S. PATENT DOCUMENTS

| | | | | |
|---|---|---|---|---|
| 2001/0011881 | A1* | 8/2001 | Emori | G01R 19/16542 320/116 |
| 2012/0212871 | A1* | 8/2012 | Taniguchi | G01R 31/3842 361/87 |
| 2013/0187609 | A1* | 7/2013 | Yen | H02J 7/007 320/118 |
| 2013/0329327 | A1* | 12/2013 | Zara | H02H 9/025 361/86 |
| 2014/0015477 | A1* | 1/2014 | Tsai | H02J 7/0042 320/107 |
| 2014/0368168 | A1* | 12/2014 | Beckman | H02J 7/0021 320/134 |
| 2015/0061573 | A1* | 3/2015 | Masato | H01M 10/441 320/107 |
| 2015/0340884 | A1* | 11/2015 | Suzuki | B60L 7/12 320/107 |
| 2016/0064969 | A1* | 3/2016 | Pernyeszi | H02J 7/0014 320/118 |
| 2016/0134160 | A1* | 5/2016 | Schultz | H01M 10/441 307/66 |

FOREIGN PATENT DOCUMENTS

| | | |
|---|---|---|
| CN | 203180596 U | 9/2013 |
| CN | 105656168 A | 6/2016 |
| JP | 5615995 B1 | 10/2014 |
| WO | 01/61819 A1 | 8/2001 |
| WO | 2012/043723 A1 | 4/2012 |

OTHER PUBLICATIONS

The Extended European Search Report for European Application No. 17193872.3, dated Apr. 26, 2018, 10 pages.
The first Office Action and Search Report dated Jun. 25, 2018 for Chinese Application No. 201610895643.6, 7 pages.

* cited by examiner

METHOD FOR HOT-PLUGGING, CONTROL DEVICE FOR HOT-PLUGGING, METHOD AND DEVICE FOR VOLTAGE BALANCE

CROSS-REFERENCE TO RELATED APPLICATION

This application is based on and claims priority to Chinese Patent Application No. 201610895643.6 filed on Oct. 14, 2016, which is incorporated herein by reference in its entirety.

TECHNICAL FIELD

The present application relates to the field of battery technology, and more particularly to a method for hot-plugging, a control device for hot-plugging, and a method and device for voltage balance.

BACKGROUND

Many power consuming devices require uninterrupted power supply, for example, a medical device in a hospital, a mobile base station, and a test device and so on all require uninterrupted power supply. If power outage occurs in battery units in a power supply system, this may lead to power outage for a power consuming device, resulting a significant reduce in the safety and stability of the power consuming device. In the related art, if any of the battery units in the power supply system needs to be replaced due to its failure, it is necessary to power off the power supply system or turn off the power supply system in order to safely replace the battery unit.

In carrying out the present disclosure, the inventors have found that there are at least the following problems in the related art:

At present, if the battery unit needs to be replaced due to its failure, this can be achieved only by turning off the power supply system or powering off the power supply system, which will lead to power outage for a power consuming device, therefore the safety and stability of the power supply system are low.

SUMMARY

In view of this, the embodiments of the present disclosure provide a method for hot-plugging, a control device for hot-plugging, and a method and device for voltage balance, which may be used to solve a contradictory problem between the replacement of the battery unit and the normal operation of the power supply system in the related art and a problem caused thereby that the safety and stability of the power supply system are low.

In one aspect, an embodiment of the present disclosure provides a method for hot-plugging, including: when there is a battery unit to be replaced in a plurality of parallel battery units, cutting off a branch in which the battery unit to be replaced locates.

According to the aspect and any possible implementation, a further implementation is provided, wherein each of the branches in which the battery units locate is connected in series with a switch circuit; and cutting off the branch in which the battery unit to be replaced locates, including: disconnecting a switch circuit connected in series with the branch in which the battery unit to be replaced locates, to turn off a charging function and a discharging function of the battery unit to be replaced.

According to the aspect and any possible implementation, a further implementation is provided, wherein the switch circuit includes a charge switch, a discharge switch, a first diode and a second diode; the charge switch and the discharge switch are connected in series, an output terminal of the first diode is connected to an output terminal of the second diode, the charge switch is connected in parallel with the first diode, the discharge switch is connected in parallel with the second diode; and disconnecting the switch circuit connected in series with the branch in which the battery unit to be replaced locates, including: turning off the charge switch of the switch circuit connected in series with the branch in which the battery unit to be replaced locates; and turning off the discharge switch of the switch circuit connected in series with the branch in which the battery unit to be replaced locates.

One of the technical solutions described above has the following advantageous effects:

In the embodiments of the present disclosure, when there is a battery unit to be replaced in a plurality of parallel battery units, a branch in which the battery unit to be replaced locates may be cut off. In the embodiments of the present disclosure, with respect to a power supply system including a plurality of parallel battery units, when any of the battery units needs to be replaced due to its failure or other abnormalities, it may be controlled to cut off the branch in which the battery unit to be replaced locates. Such that the battery unit on the branch may no longer possess the ability to perform energy interaction with other devices and there may be no current on the branch, therefore the security of the process for replacing the battery unit may be guaranteed. In addition, due to the parallel relationship between the battery units, cutting off one of the branches may not affect the normal operation of other branches. Also, the energy interaction between other battery units and power supply devices or power consuming devices may not be affected and the normal operation of the system may not be affected, thereby the safety and stability of the system may be guaranteed. Further, due to the system is not power off or turn off while replacing the battery unit, the power supply devices may not be power off during the replacement of the battery unit, therefore the power consuming requirements for the power supply system in reality may be satisfied. Thus, the embodiments of the present disclosure may solve the contradictory problem between the replacement of the battery unit and the normal operation of the power supply system in the related art and the problem caused thereby that the safety and stability of the power supply system are low.

In another aspect, an embodiment of the present disclosure provides a method for voltage balance, including: controlling charging or discharging of each battery unit in accordance with an operating state of each battery unit, after a first battery unit in a plurality of parallel battery units is replaced with a second battery unit.

According to the aspect and any possible implementation, a further implementation is provided, wherein each of the branches in which the battery units locate is connected with a charge switch and a discharge switch; controlling charging or discharging of each battery unit when the operating state of each battery unit is in a charging state, including: turning on a charge switch of each of the branches in which the battery units locate and truing off a discharge switch of each of the branches in which the battery units locate; and controlling charging or discharging of each battery unit when the operating state of each battery unit is in a discharging state, including: turning on a discharge switch of each of the branches in which the battery units locate and truing off a charge switch of each of the branches in which the battery units locate.

According to the aspect and any possible implementation, a further implementation is provided, wherein each of the branches in which the battery units locate is connected with a charge switch and a discharge switch, and the battery units are connected to each other through a designated charging circuit; controlling charging or discharging of each battery unit when the operating state of each battery unit is in a resting state, including: acquiring an absolute value of a voltage drop between the second battery unit and the other battery units; enabling the designated charging circuit if the absolute value of the voltage drop is greater than or equal to a threshold value for the voltage drop, so as to achieve a voltage balance between the second battery unit and the other battery units through the designated charging circuit; or turning on a charge switch of each of the branches in which the battery units locate and turning on a discharge switch of each of the branches in which the battery units locate if the absolute value of the voltage drop is smaller than the threshold value for the voltage drop, so as to achieve a voltage balance between said second battery unit and said other battery unit through a connected parallel circuit.

One of the technical solutions described above has the following advantageous effects:

In the embodiments of the present disclosure, charging or discharging of each battery unit may be controlled in accordance with an operating state of each battery unit, after a first battery unit in a plurality of parallel battery units is replaced with a second battery unit. In the embodiments of the present disclosure, with respect to a power supply system including a plurality of parallel battery units, after the first battery unit is replaced with the second battery unit, if there is a voltage drop between the second battery unit and the other battery units, it is easy to cause failure due to voltage imbalance. Based on this, in the embodiments of the present disclosure, after the replacement is completed, charging or discharging of each battery unit may be controlled in accordance with the operating state of each battery unit, so as to achieve a voltage balance between each battery unit. It is guaranteed that the power supply system may be able to operate normally after the battery unit is replaced, and the safety and stability of thereof may be guaranteed. Therefore, it is guaranteed that with respect to the replacement of the battery unit, the power consuming devices may not be power off, and the power consuming requirements for the power supply system in reality may be satisfied. Thus, the embodiments of the present disclosure may solve the problem that the safety and stability of the power supply system are low due to the replacement of the battery unit in the related art.

In another aspect, an embodiment of the present disclosure provides a control device for hot-plugging, including: a generating unit to generate a cut-off signal when there is a battery unit to be replaced in a plurality of parallel battery units; a transmitting unit to transmit the cut-off signal to a branch in which the battery unit to be replaced locates to cut off the branch in which the battery unit to be replaced locates.

According to the aspect and any possible implementation, a further implementation is provided, wherein each of the branches in which the battery units locate is connected in series with a switch circuit; the transmitting unit is further to transmit the cut-off signal to a switch circuit connected in series with the branch in which the battery unit to be replaced locates, so as to enable the switch circuit to turn off a charging function and a discharging function of the battery unit to be replaced after receiving the cut-off signal.

According to the aspect and any possible implementation, a further implementation is provided, wherein the switch circuit includes a charge switch, a discharge switch, a first diode and a second diode; the charge switch and the discharge switch are connected in series, an output terminal of the first diode is connected to an output terminal of the second diode, the charge switch is connected in parallel with the first diode, the discharge switch is connected in parallel with the second diode; and the transmitting unit is further to transmit the cut-off signal to a charge switch and a discharge switch in a switch circuit connected in series with the branch in which the battery unit to be replaced locates respectively, so as to enable the charge switch to disconnect the branch in which the battery unit to be replaced after receiving the cut-off signal and to enable the discharge switch to disconnect the branch in which the battery unit to be replaced after receiving the cut-off signal.

One of the technical solutions described above has the following advantageous effects:

An embodiment of the present disclosure provides a control device for hot-plugging. A generating unit in the device is used to generate a cut-off signal when there is a battery unit to be replaced in a plurality of parallel battery units, and a transmitting unit in the device is used to transmit the cut-off signal to a branch in which the battery unit to be replaced locates to cut off the branch in which the battery unit to be replaced locates. In the embodiments of the present disclosure, with respect to a power supply system including a plurality of parallel battery units, when any of the battery units needs to be replaced due to its failure or other abnormality, it may be controlled to cut off the branch in which the battery unit to be replaced locates. Such that the battery unit on the branch may no longer possess the ability to perform energy interaction with other devices and there may be no current on the branch, therefore the security of the process for replacing the battery unit may be guaranteed. In addition, due to the parallel relationship between the battery units, cutting off one of the branches may not affect the normal operation of other branches. Also, the energy interaction between other battery units and power supply devices or power consuming devices may not be affected and the normal operation of the system may not be affected, thereby the safety and stability of the system may be guaranteed. Further, due to the system is not power off or turn off while replacing the battery unit, the power supply devices may not be power off during the replacement of the battery unit, therefore the power consuming requirements for the power supply system in reality may be satisfied. Thus, the embodiments of the present disclosure may solve the contradictory problem between the replacement of the battery unit and the normal operation of the power supply system in the related art and the problem caused thereby that the safety and stability of the power supply system are low.

In another aspect, an embodiment of the present disclosure provides a device for voltage balance, including: a generating unit to generate a control signal for charging or discharging of each battery unit in accordance with an operating state of each battery unit, after a first battery unit in a plurality of parallel battery units is replaced with a second battery unit; and a transmitting unit to transmit the control signal to each battery unit to enable to control charging or discharging of each battery unit.

According to the aspect and any possible implementation, a further implementation is provided, wherein each of the branches in which the battery units locate is connected with a charge switch and a discharge switch; when the operating state of each battery unit is in a charging state, the generating unit is to: generate a first turn-on control signal for instructing the turning on of a charge switch of each of the branches in which the battery units locate, and a first turn-off control signal for instructing the turning off of a discharge switch of each of the branches in which the battery units locate; and the transmitting unit is further to transmit the first turn-on control signal to the charge switch of each of the branches in which the battery units locate and transmit the first turn-off control signal to the discharge switch of each of the branches in which the battery units locate.

According to the aspect and any possible implementation, a further implementation is provided, wherein each of the branches in which the battery units locate is connected with a charge switch and a discharge switch; when the operating state of each battery unit is in a discharging state, the generating unit is to: generate a second turn-on control signal for instructing the turning on of a discharge switch of each of the branches in which the battery units locate, and a second turn-off control signal for instructing the turning off of a charge switch of each of the branches in which the battery units locate; and the transmitting unit is further to transmit the second turn-on control signal to a discharge switch of each of the branches in which the battery units locate and transmit the second turn-off control signal to the charge switch of each of the branches in which the battery units locate.

One of the technical solutions described above has the following advantageous effects:

An embodiment of the present disclosure provides a device for voltage balance. A generating unit in the device is used to generate a control signal for charging or discharging of each battery unit in accordance with an operating state of each battery unit, after a first battery unit in a plurality of parallel battery units is replaced with a second battery unit; and a transmitting unit in the device is used to transmit the control signal to each battery unit to enable charging or discharging of each battery unit. In the embodiments of the present disclosure, with respect to a power supply system including a plurality of parallel battery units, after the first battery unit is replaced with the second battery unit, if there is a voltage drop between the second battery unit and the other battery units, it is easy to cause failure due to voltage imbalance. Based on this, in the embodiments of the present disclosure, after the replacement is completed, charging or discharging of each battery unit may be controlled in accordance with the operating state of each battery unit, so as to achieve a voltage balance between each battery unit. It is guaranteed that the power supply system may be able to operate normally after the battery unit is replaced, and the safety and stability of thereof may be guaranteed. Therefore, it is guaranteed that with respect to the replacement of the battery unit, the power consuming devices may not be power off, and the power consuming requirements for the power supply system in reality may be satisfied. Thus, the embodiments of the present disclosure may solve the problem that the safety and stability of the power supply system are low due to the replacement of the battery unit in the related art.

BRIEF DESCRIPTION OF THE DRAWINGS

In order to illustrate the technical solution of the embodiments of the present disclosure, the drawings to be used in the embodiments will be briefly described. It will be apparent that the drawings in the following description are merely some embodiments of the present disclosure. Those skilled in the art may further obtain other drawings in accordance with these drawings without making creative work.

DETAILED DESCRIPTION

To clarify the technical solution of the present disclosure, the embodiments of the present disclosure will be described in detail below in conjunction with drawings.

It should be understood that the described embodiments are merely part of the embodiments of the disclosure and are not intended to be exhaustive. Based on the embodiments of the present disclosure, all other embodiments obtained by those skilled in the art without making creative work are within the scope of the present disclosure.

The terms used in the embodiments of the present disclosure are merely for the purpose of describing particular embodiments and are not intended to limit the present disclosure. "a", "an", "the", and "this" in a singular form used in the embodiments of the present disclosure and the appended claims are also intended to include a majority form, unless the context clearly dictates otherwise.

It should be understood that the term "and/or" used herein is merely an association describing associated objects, which indicating that there may be three relationships, for example, A and/or B, which may represent A, B, and A and B. In addition, the character "/" herein generally indicates that the associated objects are in an "or" relationship.

It should be understood that although the control signals and the like may be described using the terms first, second, third, etc. in the embodiments of the present disclosure, these control signals and the like should not be limited to these terms. These terms are used only to distinguish the control signals from each other. For example, a first control signal may also be referred to as a second control signal without departing from the scope of the embodiments of the present disclosure. Similarly, the second control signal may also be referred to as the first control signal.

Depending on the context, the word "if" used herein may be interpreted as "when" or "while" or "in response to a determination" or "in response to a detection". Similarly, depending on the context, the phrase "if it is determined" or "if it is detected that (a stated condition or event)" may be interpreted as "when it is determined" or "in response to a determination" or "when it is detected that (a stated condition or event)" or "in response to a detection that (a stated condition or event)".

Example 1

An embodiment of the present disclosure provides a method for hot-plugging, including: when there is a battery unit to be replaced in a plurality of parallel battery units, cutting off a branch in which the battery unit to be replaced locates.

In particular, the battery unit mentioned in the embodiments of the present disclosure may include, but not limited to, a cell, a battery pack, a battery cabinet, etc., and the embodiments of the present disclosure are not particularly limited thereto. In particular, the battery pack may include, but not limited to, a plurality of cells, and the battery cabinet may include, but not limited to, a plurality of battery packs and hosts. In a specific implementation, when the battery unit is the battery cabinet, a plurality of battery cabinets may be in parallel, wherein a host in one of the plurality of battery cabinets may be used as the host of the whole power supply system.

It should be noted that the number specified by "a plurality of" in the embodiments of the present disclosure may be at least two and the specific number may not be limited. The number of the battery units to be replaced in the embodiments of the present disclosure may not be particularly limited.

For example, in a power supply system composed of N battery units in parallel, when there are S battery units to be replaced, the branches in which the S battery units to be replaced locate may be cut off, wherein N is an integer greater than 1, and S is an integer that ranges from 1 to N−1.

The power supply system provided by the embodiments of the present disclosure may include a power source, or a system including N battery units in parallel and a power source in which the system including N battery units in parallel may be an energy storage system, and N is an integer greater than 1. It will be appreciated that if the power supply system includes only the power source, the system including N battery units in parallel may be located within the power source.

In particular, the power supply system in the embodiments of the present disclosure may have a charging function and a discharge function, that is, the power supply system may receive power from a power source or other power supply devices, and/or the power supply system may supply power for power consuming devices.

In particular, in the embodiments of the present disclosure, the power supply device may include, but not limited to, a power transformer, a mutual inductor, a device and apparatus for preventing overvoltages, a switching device, a power distribution and combination device, a power line, a reactive power compensation device, etc. The power consuming device may include, but not limited to, an electromechanical device, an electric heating device, an electric welding machine, a direct current power consuming device and direct current power source, a refrigeration and air conditioning device, an electric traction device, an electric lighting device, etc.

In the embodiments of the present disclosure, in a power supply system including a plurality of parallel battery units, when any of the battery units needs to be replaced due to its failure or other problems, the branch in which the battery unit to be replaced locates may be cut off. Such that there may be no current on the branch and the battery unit on the branch may not possess the ability to perform energy interaction with other devices. Therefore, a maintainer may manually replace the battery unit to be replaced after the system has automatically cut off the branch. As such, the parallel battery units on the other branches may not be affected, and the parallel battery units on the other branches may perform energy interaction with other devices normally and the power supply system may also operate normally. Therefore, it is guaranteed that the battery unit to be replaced may be replaced without the power supply system being power off or turn off, that is, the hot-plugging process may be performed safely, and the safety and stability of the power supply system may be guaranteed.

In particular, in the embodiments of the present disclosure, the plurality of battery units are in parallel, and each of the branches in which the battery units locate may be connected in series with a switch circuit. As such, cutting off the branch in which the battery unit to be replaced locates may be implemented by disconnecting a switch circuit connected in series with the branch in which the battery unit to be replaced locates, so as to achieve the purpose of turning off the charging function and the discharging function of the battery unit.

Figure 1:
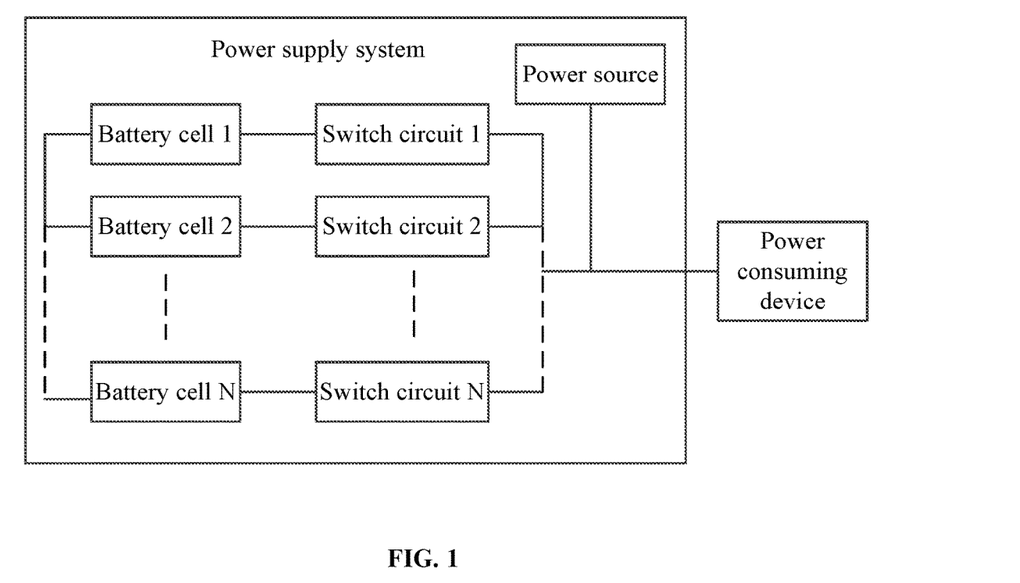
FIG. 1 is a schematic diagram of a connection relationship of a power supply system in an embodiment of the present disclosure.

The power supply system shown in FIG. 1 may be used as an example. Referring to FIG. 1, which is a schematic diagram of a connection relationship of a power supply system in an embodiment of the present disclosure.

The power supply system shown in FIG. 1 may include N battery units and a power source, wherein the N battery units are connected in parallel, and each of the branches in which the battery units locate may be connected in series with a switch circuit. Wherein N is an integer greater than 1. As shown in FIG. 1, the power supply system may also be connected to a power consuming device.

As shown in FIG. 1, in order to cut off the branch in which the battery unit to be replaced locates, the switch circuit on that branch may be disconnected.

It should be noted that the power supply system shown in FIG. 1 is only used to describe the parallel relationship between the battery units and the relationship between the switch circuits connected in series with each of the branches in which the battery units locate, and which is only a specific embodiment of the power supply system in the embodiments of the present disclosure, and is not intended to limit the present application.

In a specific implementation, the performer of the method for hot-plugging provided in the embodiments of the present disclosure may be a host. When there is a battery unit to be replaced, the host may generate a disconnection signal and transmit the disconnection signal to the switch circuit on the branch in which the battery unit locates, so that the switch circuit may disconnect the branch after receiving the disconnection signal.

In particular, the host may also monitor the plurality of battery units, and determine whether there is a battery unit to be replaced in the plurality of parallel battery units. For example, the host may collect operating parameters of each battery unit (such as voltage, temperature, current, etc.), and may determine whether there is a battery unit to be replaced based on the operating parameters. In particular, if there is an abnormality in the operating parameters of the battery unit, it can be determined that the battery unit may be a battery unit to be replaced.

Figure 2:
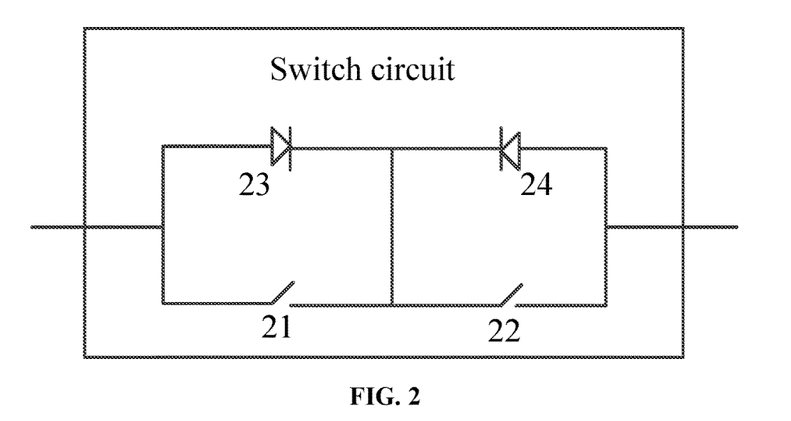
FIG. 2 is a structure diagram of a switch circuit in an embodiment of the present disclosure.

Referring to FIG. 2, which is a schematic diagram of a switch circuit in an embodiment of the present disclosure. As shown in FIG. 2, the switch circuit may include a charge switch 21, a discharge switch 22, a first diode 23, and a second diode 24.

In particular, as shown in FIG. 2, the charge switch 21 and the discharge switch 22 may be connected in series. An output terminal of the first diode 23 may be connected to an output terminal of the second diode 24, the charge switch 21 may be connected in parallel with the first diode 23, and the discharge switch 22 may be connected in parallel with the second diode 24.

In a specific implementation, the switch circuit in the power supply system shown in FIG. 1 may be in the circuit structure shown in FIG. 2, in order to disconnect the switch circuit corresponding to the battery unit to be replaced, the charge switch 21 and the discharge switch 22 may be turned off.

In particular, the host may transmit the disconnection signal to the charge switch 21 and the discharge switch 22 in the switch circuit shown in FIG. 2, respectively, so that the charge switch 21 may disconnect the connection after receiving the disconnection signal and the discharge switch 22 may also disconnect the connection after receiving the disconnection signal. In the switch circuit shown in FIG. 2, since the output terminal of the first diode 23 is connected to the output terminal of the second diode 24, the switch circuit may not be turned on, that is, the branch in which the battery unit to be replaced locates may be disconnected.

In particular, as shown in FIG. 2, when the charge switch 21 and the discharge switch 22 are turned off, both ends of the switch circuit may not be turned on, such that, there may be no energy interaction between the battery unit to be replaced on a side of the switch circuit and the power consuming devices on the other side of the switch circuit, and the battery unit to be replaced may be safely replaced.

In a specific implementation, the charge switch 21 shown in FIG. 2 may include a charge relay. In another specific implementation, the discharge switch 22 shown in FIG. 2 may include a discharge relay.

One of the technical solutions described above has the following advantageous effects:

In the embodiments of the present disclosure, when there is a battery unit to be replaced in a plurality of parallel battery units, a branch in which the battery unit to be replaced locates may be cut off. In the embodiments of the present disclosure, with respect to a power supply system including a plurality of parallel battery units, when any of the battery units needs to be replaced due to its failure or other abnormality, it may be controlled to cut off the branch in which the battery unit to be replaced locates. Such that the battery unit on the branch may no longer possess the ability to perform energy interaction with other devices and there may be no current on the branch, therefore the security of the process for replacing the battery unit may be guaranteed. In addition, due to the parallel relationship between the battery units, cutting off one of the branches may not affect the normal operation of other branches. Also, the energy interaction between other battery units and power supply devices or power consuming devices may not be affected and the normal operation of the system may not be affected, thereby the safety and stability of the system may be guaranteed. Further, due to the system is not power off or turn off while replacing the battery unit, the power supply devices may not be power off during the replacement of the battery unit, therefore the power consuming requirements for the power supply system in reality may be satisfied. Thus, the embodiments of the present disclosure may solve the contradictory problem between the replacement of the battery unit and the normal operation of the power supply system in the related art and the problem caused thereby that the safety and stability of the power supply system are low.

Example 2

In order to solve the problem that the safety and stability of the power supply system are low in the related art, an embodiment of the present disclosure provides a method for voltage balance, including: controlling charging or discharging of each battery unit in accordance with an operating state of each battery unit, after a first battery unit in a plurality of parallel battery units is replaced with a second battery unit.

In particular, in the embodiments of the present disclosure, the operating state of each battery unit may include a discharging state, a charging state, and a resting state. In particular, when the operating state of each battery unit is in the charging state, the power supply devices may supply power for each battery unit; when the operating state of each battery unit is in the discharging state, each battery unit may supply power for the power consuming devices; when the operating state of each battery unit is in the resting state, there may be no energy interaction between each battery unit and the power supply devices and/or the power consuming devices.

It should be noted that in the embodiments of the present disclosure, the number of the first battery units and the number of the second battery units are equal, that is, if there are S first battery units failing, it is necessary to replace that S first battery units with S second battery units. The embodiments of the present disclosure do not limit the specific number of S.

In a specific implementation, the performer of the method for voltage balance provided in the embodiments of the present disclosure may be a host.

In particular, after the first battery unit in the plurality of parallel battery units is replaced with the second battery unit, the host may generate a control signal for the charging or discharging of each battery unit according to the operating state of each battery unit. The control signal may then be transmitted to each battery unit to enable to control charging or discharging of each battery unit.

In particular, in the embodiments of the present disclosure, based on the difference of the operating state of each battery unit, the way to control the charging or discharging of each battery unit may include, but not limited to, the following three cases:

In the first case: the charging or discharging of each battery unit may be controlled when the operating state of each battery unit is in the charging state.

In a specific implementation, each of the branches in which the battery units locate may be connected with a charge switch and a discharge switch. As such, when the host controls the charging or discharging of each battery unit, the host may generate a first turn-on control signal for instructing the turning on of a charge switch of each of the branches in which the battery units locate and a first turn-off control signal for instructing the turning off of a discharge switch of each of the branches in which the battery units locate; the host may then transmit the first turn-on control signal to the charge switch of each of the branches in which the battery units locate, and transmit the first turn-off control signal to the discharge switch of each of the branches in which the battery units locate; and then the charge switch of each of the branches in which the battery units locate may turn on after receiving the first turn-on control signal, and the discharge switch of each of the branches in which the battery units locate may turn off after receiving the first turn-off control signal, so that the charging or discharging of each battery unit may be controlled.

In particular, referring to FIG. 2, if the charge switch 21 is turned on and the discharge switch 22 is turned off, the current may flow only through the second diode 24 and the charge switch 21, and finally flow into the battery unit. As such, each battery unit may have a charging function, that is, the power supply device may charge each battery unit through the switch circuit.

In particular, considering that the voltage of the newly replaced second battery unit may differ from the voltage of the other battery units in the power supply system, it is also necessary to acquire the voltage of the second battery unit and the voltage of the other battery units.

The host may compare the voltage of the second battery unit and the voltage of the other battery units after acquiring the voltage of the second battery unit and the voltage of the other battery units, and may perform the following two solutions based on the difference between the voltage of the second battery unit and the voltage of the other battery units:

Solution A: If the voltage of the second battery unit is greater than the voltage of the other battery units, a designated charging circuit may be enabled, so that the second battery unit may charge the other battery units via the designated charging circuit. As such, the power source may be controlled charge the other battery units.

It should be noted that the designated charging circuit may be independent from the parallel circuit composed of the plurality of battery units in the embodiments of the present disclosure. When the designated charging circuit is enabled, the parallel battery units may charge each other via the designated charging circuit.

In particular, if the voltage of the second battery unit is greater than the voltage of the other battery units, the host may generate a third control signal for instructing the enabling of the designated charging circuit, and transmit the third control signal to the designated charging circuit. After the designated charging circuit is enabled, since the voltage of the second battery unit is larger than the voltage of the other battery units, the second battery unit may charge the other battery units via the designated charging circuit.

And, the host may generate a fourth control signal for instructing the power source to charge the other battery units, and transmit the fourth control signal to the power source. The power source may charge the other battery units via the branches in which the charge switches in the connected switch circuits locate after receiving the fourth control signal.

In a specific implementation, the designated charging circuit may be a precharge circuit existed in the power supply system itself.

Solution B: If the voltage of the second battery unit is smaller than the voltage of the other battery units, the power source may be controlled to charge the second battery unit.

In particular, if the voltage of the second battery unit is smaller than the voltage of the other battery units, the host may generate a fifth control signal for instructing the power source to charge the second battery unit, and transmit the fifth control signal to the power source. The power source may charge the second battery unit via the branch in which the charge switch in the connected switch circuit locates after receiving the fifth control signal.

As such, since the charge switch in the switch circuit is turned on and the discharge switch is turned off, the second battery unit may be directly charged by the power supply devices.

In the second case: the charging or discharging of each battery unit may be controlled when the operating state of each battery unit is in the discharging state.

In a specific implementation, each of the branches in which the battery units locate may be connected with a charge switch and a discharge switch. As such, when the host controls the charging or discharging of each battery unit, the host may generate a second turn-on control signal for instructing the turning on of a discharge switch of each of the branches in which the battery units locate and a second turn-off control signal for instructing the turning off of a charge switch of each of the branches in which the battery units locate; the host may then transmit the second turn-on control signal to the discharge switch of each of the branches in which the battery units locate, and transmit the second turn-off control signal to the charge switch of each of the branches in which the battery units locate; and then the discharge switch of each of the branches in which the battery units locate may turn on after receiving the second turn-on control signal, and the charge switch of each of the branches in which the battery units locate may turn off after receiving the second turn-off control signal, so that the charging or discharging of each battery unit may be controlled.

In particular, referring to FIG. 2, if the discharge switch 22 is turned on and the charge switch 21 is turned off, the current may flow from the battery unit into the first diode 23, and then flow through the discharge switch 22 into the power consuming devices. As such, each battery unit may have a discharge function, that is, each battery unit may charge the power consuming devices through the switch circuit.

In particular, considering that the voltage of the newly replaced second battery unit may differ from the voltage of the other battery units in the power supply system, it is also necessary to acquire the voltage of the second battery unit and the voltage of the other battery units.

The host may compare the voltage of the second battery unit and the voltage of the other battery units after acquiring the voltage of the second battery unit and the voltage of the other battery units, and may perform the following two solutions based on the difference between the voltage of the second battery unit and the voltage of the other battery units:

Solution C: If the voltage of the second battery unit is greater than the voltage of the other battery units, the second battery unit may individually supply power for the power consuming devices.

In particular, if the voltage of the second battery unit is greater than the voltage of the other battery units, the host may generate a sixth control signal for instructing the second battery unit to individually supply power for the power consuming devices, and transmit the sixth control signal to the second battery unit. Such that, the second battery unit may individually supply power for the power consuming devices via the branch in which the discharge switch in the connected switch circuit locates after receiving the sixth control signal.

As such, since the voltage of the second battery unit is high, the second battery unit may individually supply power for the power consuming devices until the voltage of the second battery unit coincides with the voltage of the other battery units, and then, all the battery units may supply power for the power consuming devices.

Solution D: If the voltage of the second battery unit is smaller than the voltage of the other battery units, the designated charging circuit may be enabled, so that the other battery units may charge the second battery unit via the designated charging circuit.

In particular, if the voltage of the second battery unit is smaller than the voltage of the other battery units, the host may generate a seventh control signal for instructing the enabling of the designated charging circuit, and transmit the seventh control signal to the designated charging circuit. The designated charging circuit may be enabled after receiving the seventh control signal, and since the voltage of the second battery unit is smaller than that of the other battery units, the other battery units may charge the second battery unit with the connected designated charging circuit.

As such, since the charge switch of each of the branches in which the battery units locate is turned off, the power consuming devices and the other battery units may not charge the second battery unit through the parallel circuit.

In the third case: the charging or discharging of each battery unit may be controlled when the operating state of each battery unit is in the resting state.

Considering that the voltage balance has not been achieved when each battery unit is in the resting state, the host may acquire an absolute value of a voltage drop between the second battery unit and the other battery units, and may perform the following two solutions based on the absolute value of the voltage drop.

Solution E: If the absolute value of the voltage drop is greater than or equal to a threshold value for the voltage drop, a designated charging circuit may be enabled, so that the second battery unit and the other battery units may achieve the voltage balance via the designated charging circuit.

In particular, if the absolute value of the voltage drop is greater than or equal to the threshold value for the voltage drop, the voltage drop between the voltage of the second battery unit and the voltage of the other battery units is large, and it is necessary to enable the designated charging circuit and charge via the designated charging circuit, so that the voltage of each battery unit may be balanced.

As such, if the absolute value of the voltage drop is greater than or equal to the threshold value for the voltage drop, the host may generate an eighth control signal for instructing the enabling of the designated charging circuit, and transmit the eighth control signal to the designated charging circuit. The designated charging circuit may be enabled after receiving the eighth control signal, and the other battery units and the second battery unit may charge each other via the designated charging circuit to achieve voltage balance. In particular, if the voltage of the second battery unit is smaller than the voltage of the other battery units, the other battery units may charge the second battery unit via the designated charging circuit; or if the voltage of the second battery unit is larger than the voltage of the other battery units, the second battery unit may charge the other battery units via the designated charging circuit.

It should be noted that the threshold value for the voltage drop may be related to the battery unit, and the embodiments of the present disclosure are not particularly limited thereto. In a specific implementation, the threshold value for the voltage drop is about 300 mV.

Solution D: If the absolute value of the voltage drop is smaller than the threshold value for the voltage drop, the charge switch and the discharge switch of each of the branches in which the battery units locate may be turned on, so that the second battery unit and the other battery units may achieve the voltage balance via the connected parallel circuit.

In particular, if the absolute value of the voltage drop is smaller than the threshold value for the voltage drop, the voltage drop between the voltage of the second battery unit and the voltage of the other battery units is small. The charge switch and the discharge switch of each of the branches in which the battery units locate may be turned on, so that the parallel circuit composed of the battery units may be connected, and each battery unit may achieve voltage balance via the parallel circuit.

In particular, if the absolute value of the voltage drop is smaller than the threshold value for the voltage drop, the host may generate a ninth turn-on control signal for instructing the turning on of the charge switch of each of the branches in which the battery units locate and a tenth turn-on control signal for instructing the turning on of the discharge switch of each of the branches in which the battery units locate. Then, the ninth turn-on control signal may be transmitted to the charge switch of each of the branches in which the battery units locate and the tenth turn-on control signal may be transmitted to the discharge switch of each of the branches in which the battery units locate. Then, the charge switch of each of the branches in which the battery units locate may turn on after receiving the ninth turn-on control signal, and the discharge switch of each of the branches in which the battery units locate may turn on after receiving the tenth turn-on control signal. Such that, the parallel circuit of the battery units may be connected, and each battery unit may achieve voltage balance via the parallel circuit.

In particular, if the voltage of the second battery unit is smaller than the voltage of the other battery units, the other battery units may charge the second battery unit via the parallel circuit; or if the voltage of the second battery unit is larger than the voltage of the other battery units, the second battery unit may charge the other battery units via the parallel circuit.

It should be noted that the end of the method for voltage balance described above may include, but not limited to, that the voltage of each battery unit achieves the voltage balance, and/or the operating state of each battery unit changes.

It should be noted that when each battery unit ends in one of the above-mentioned operating states, the voltage of each battery unit may not yet achieve the voltage balance. Therefore, when the operating state of each battery unit is another state, the above solution corresponding to the another state may be used to balance the voltage of each battery unit, so as to guarantee the safety and stability of the power supply system.

For example, the operation state of each battery unit may change from the charging state to another state at the end of the charging process, and the voltage of each battery unit may not yet achieve the voltage balance. As such, if the operating state of each battery unit is the discharging state, the voltage of each battery unit may be balanced by the solution for voltage balance corresponding to the discharge state, and which will not be specifically described in the embodiments of the present disclosure.

One of the technical solutions described above has the following advantageous effects:

In the embodiments of the present disclosure, charging or discharging of each battery unit may be controlled in accordance with an operating state of each battery unit, after a first battery unit in a plurality of parallel battery units is replaced with a second battery unit. In the embodiments of the present disclosure, with respect to a power supply system including a plurality of parallel battery units, after the first battery unit is replaced with the second battery unit, if there is a voltage drop between the second battery unit and the other battery units, it is easy to cause failure due to voltage imbalance. Based on this, in the embodiments of the present disclosure, after the replacement is completed, charging or discharging of each battery unit may be controlled in accordance with the operating state of each battery unit, so as to achieve a voltage balance between each battery unit. It is guaranteed that the power supply system may be able to operate normally after the battery unit is replaced, and the safety and stability of thereof may be guaranteed. Therefore, it is guaranteed that with respect to the replacement of the battery unit, the power consuming devices may not be power off, and the power consuming requirements for the power supply system in reality may be satisfied. Thus, the embodiments of the present disclosure may solve the problem that the safety and stability of the power supply system are low due to the replacement of the battery unit in the related art.

Example 3

According to the method for hot-plugging provided by the above example 1, an embodiment of the present disclosure further provides a device for implementing the steps and methods of the above method.

Figure 3:
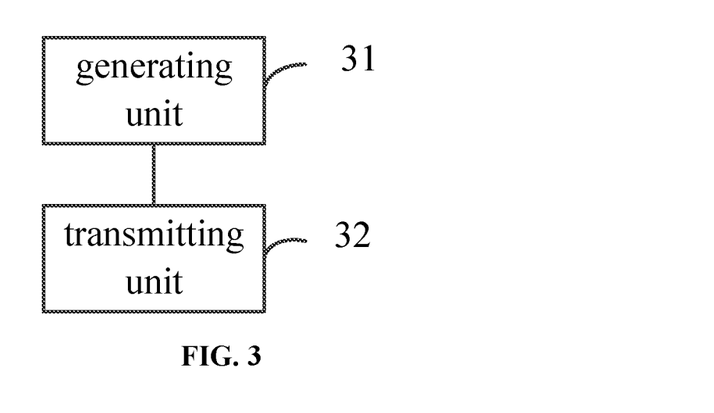
FIG. 3 is a functional block diagram of a control device for hot-plugging provided in an embodiment of the present disclosure.

In particular, the embodiments of the present disclosure provide a control device for hot-plugging. Referring to FIG. 3, which is a functional block diagram of the control device for hot-plugging provided in the embodiments of the present disclosure. As shown in FIG. 3, the device may include: a generating unit 31 to generate a cut-off signal when there is a battery unit to be replaced in a plurality of parallel battery units; a transmitting unit 32 to transmit the cut-off signal to a branch in which the battery unit to be replaced locates to cut off the branch in which the battery unit to be replaced locates.

In particular, in the embodiments of the present disclosure, each of the branches in which the battery units locate may be connected in series with a switch circuit; the transmitting unit may further be used to transmit the cut-off signal to a switch circuit connected in series with the branch in which the battery unit to be replaced locates, so as to enable the switch circuit to turn off the charging function and the discharging function of the battery unit to be replaced after receiving the cut-off signal.

In a specific implementation, as shown in FIG. 2, the switch circuit may include a charge switch 21, a discharge switch 22, a first diode 23, and a second diode 24.

In particular, as shown in FIG. 2, the charge switch 21 and the discharge switch 22 may be connected in series. The output terminal of the first diode 23 may be connected to the output terminal of the second diode 24. The charge switch 21 may be connected in parallel with the first diode 23. The discharge switch 22 may be connected in parallel with the second diode 24.

As such, the transmitting unit 31 may further be used to transmit the cut-off signal to a charge switch and a discharge switch in a switch circuit connected in series with the branch in which the battery unit to be replaced locates respectively, so as to enable the charge switch to disconnect the branch in which the battery unit to be replaced after receiving the cut-off signal and to enable the discharge switch to disconnect the branch in which the battery unit to be replaced after receiving the cut-off signal.

Since each unit in this embodiment may perform the method shown in the example 1, a part of this embodiment which is not described in details may refer to the description of the example 1.

One of the technical solutions described above has the following advantageous effects:

An embodiment of the present disclosure provides a control device for hot-plugging. A generating unit in the device is used to generate a cut-off signal when there is a battery unit to be replaced in a plurality of parallel battery units, and a transmitting unit in the device is used to transmit the cut-off signal to a branch in which the battery unit to be replaced locates to cut off the branch in which the battery unit to be replaced locates. In the embodiments of the present disclosure, with respect to a power supply system including a plurality of parallel battery units, when any of the battery units needs to be replaced due to its failure or other abnormality, it may be controlled to cut off the branch in which the battery unit to be replaced locates. Such that the battery unit on the branch may no longer possess the ability to perform energy interaction with other devices and there may be no current on the branch, therefore the security of the process for replacing the battery unit may be guaranteed. In addition, due to the parallel relationship between the battery units, cutting off one of the branches may not affect the normal operation of other branches. Also, the energy interaction between other battery units and power supply devices or power consuming devices may not be affected and the normal operation of the system may not be affected, thereby the safety and stability of the system may be guaranteed. Further, due to the system is not power off or turn off while replacing the battery unit, the power supply devices may not be power off during the replacement of the battery unit, therefore the power consuming requirements for the power supply system in reality may be satisfied. Thus, the embodiments of the present disclosure may solve the contradictory problem between the replacement of the battery unit and the normal operation of the power supply system in the related art and the problem caused thereby that the safety and stability of the power supply system are low.

Example 4

According to the method for voltage balance provided by the above example 2, an embodiment of the present disclosure further provides a device for implementing the steps and methods of the above method.

Figure 4:
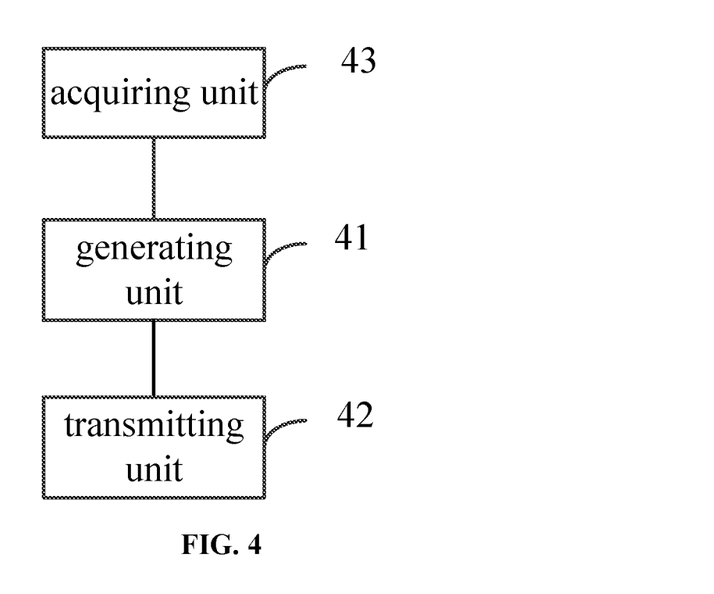
FIG. 4 is a functional block diagram of a device for voltage balance provided in an embodiment of the present disclosure.

In particular, an embodiment of the present disclosure provides a device for voltage balance. Referring to FIG. 4, which is a functional block diagram of the device for voltage balance provided in the embodiments of the present disclosure. As shown in FIG. 4, the device may include: a generating unit 41 to generate a control signal for charging or discharging of each battery unit in accordance with an operating state of each battery unit, after a first battery unit in a plurality of parallel battery units is replaced with a second battery unit; and a transmitting unit 42 to transmit the control signal to each battery unit to enable to control charging or discharging of each battery unit.

In particular, in the embodiments of the present disclosure, each of the branches in which the battery units locate may be connected with a charge switch and a discharge switch; when the operating state of each battery unit is in a charging state, the generating unit 41 may be used to: generate a first turn-on control signal for instructing the turning on of a charge switch of each of the branches in which the battery units locate, and a first turn-off control signal for instructing the turning off of a discharge switch of each of the branches in which the battery units locate; and the transmitting unit 42 may be further used to transmit the first turn-on control signal to the charge switch of each of the branches in which the battery units locate and transmit the first turn-off control signal to the discharge switch of each of the branches in which the battery units locate.

In particular, in the embodiments of the present disclosure, each of the branches in which the battery units locate may be connected with a charge switch and a discharge switch; when the operating state of each battery unit is in a discharging state, the generating unit 41 may be used to: generate a second turn-on control signal for instructing the turning on of a discharge switch of each of the branches in which the battery units locate, and a second turn-off control signal for instructing the turning off of a charge switch of each of the branches in which the battery units locate; and the transmitting unit 42 may be further used to transmit the second turn-on control signal to a discharge switch of each of the branches in which the battery units locate and transmit the second turn-off control signal to the charge switch of each of the branches in which the battery units locate.

In particular, in the embodiments of the present disclosure, each of the branches in which the battery units locate may be connected with a charge switch and a discharge switch; each battery unit may connected with each other via a designated charging circuit; and the apparatus may further include: an acquisition unit 43 to acquire an absolute value of a voltage drop between the second battery unit and the other battery units when the operating state of each battery unit is in a resting state.

The generating unit 41 may be further used to generate an eighth control signal for instructing the enabling of the designated charging circuit if the absolute value of the voltage drop is greater than or equal to the threshold value for the voltage drop, or generate a ninth turn-on control signal for instructing the turning on of the charge switch of each of the branches in which the battery units locate and a tenth turn-on control signal for instructing the turning on of the discharge switch of each of the branches in which the battery units locate if the absolute value of the voltage drop is smaller than the threshold value for the voltage drop.

The transmission unit 42 may be further used to transmit the eighth control signal to the designated charging circuit so that the second battery unit and the other battery units may achieve the voltage balance via the designated charging circuit, or transmit the ninth turn-on control signal to the charge switch of each of the branches in which the battery units locate and the tenth turn-on control signal to the discharge switch of each of the branches in which the battery units locate so that the second battery unit and the other battery units may achieve the voltage balance via the connected parallel circuit.

Since each unit in this embodiment may perform the method shown in the example 2, a part of this embodiment which is not described in details may refer to the description of the example 2.

One of the technical solutions described above has the following advantageous effects:

An embodiment of the present disclosure provides a device for voltage balance. A generating unit in the device is used to generate a control signal for charging or discharging of each battery unit in accordance with an operating state of each battery unit, after a first battery unit in a plurality of parallel battery units is replaced with a second battery unit; and a transmitting unit in the device is used to transmit the control signal to each battery unit to enable charging or discharging of each battery unit. In the embodiments of the present disclosure, with respect to a power supply system including a plurality of parallel battery units, after the first battery unit is replaced with the second battery unit, if there is a voltage drop between the second battery unit and the other battery units, it is easy to cause failure due to voltage imbalance. Based on this, in the embodiments of the present disclosure, after the replacement is completed, charging or discharging of each battery unit may be controlled in accordance with the operating state of each battery unit, so as to achieve a voltage balance between each battery unit. It is guaranteed that the power supply system may be able to operate normally after the battery unit is replaced, and the safety and stability of thereof may be guaranteed. Therefore, it is guaranteed that with respect to the replacement of the battery unit, the power consuming devices may not be power off, and the power consuming requirements for the power supply system in reality may be satisfied. Thus, the embodiments of the present disclosure may solve the problem that the safety and stability of the power supply system are low due to the replacement of the battery unit in the related art.

It will be apparent to those skilled in the art that the specific process of the described systems, devices and units may refer to the corresponding process in the foregoing embodiments of the method and will not be described herein for the convenience and simplicity of description.

In several embodiments provided by the present disclosure, it should be understood that the disclosed systems, devices and methods may be implemented in other ways. For example, the embodiments of the devices described above are merely illustrative, for example, the division of the units is only a logical function division, and there may be additional division ways for actual implementation, for example, a plurality of units or components may be combined or may be integrated into another system, or some features may be ignored or not executed. In other respects, the coupling or direct coupling or communication connection shown or discussed may be an indirect coupling or communication connection through a number of interfaces, devices or units, and may be electrical, mechanical, or other forms.

The units described as the separated components may or may not be physically separated, and the components shown as units may or may not be physical units, i.e., may be located in one place or may be distributed over a plurality of network units. The part or all of the units may be selected according to the actual needs to achieve the purpose of the embodiments.

In addition, the functional units in the various embodiments of the present disclosure may be integrated in one processing unit, or each unit may be physically and individually existed, or two or more units may be integrated in one unit. The above-mentioned integrated unit may be implemented in the form of hardware, or in the form of hardware and software function units.

The above integrated unit implemented in the form of software function units may be stored in a computer-readable storage medium. The software function units described above may be stored in a storage medium, including instructions for enabling a computer device (which may be a personal computer, a server, a network device, etc.) or a processor to perform the steps of the methods described in the various embodiments of the present disclosure. The aforementioned storage medium may include a USB disk, a mobile hard disk, a read-only memory (ROM), a random access memory (RAM), a magnetic disk, or an optical disk, or a variety of media that can store programs.

The foregoing descriptions are merely the preferred embodiments of the present disclosure and are not intended to limit the present disclosure, and any modifications, equivalent substitutions, improvements, and the like made within the spirit and principles of the present disclosure are intended to be included within the claimed scope of the present disclosure.

What is claimed is:

1. A method for voltage balance, comprising:
controlling charging or discharging of each battery unit in accordance with an operating state of each battery unit, after a first battery unit in a plurality of parallel battery units is replaced with a second battery unit,
wherein each of the branches in which the battery units locate is connected with a charge switch and a discharge switch, and the battery units are connected to each other through a designated charging circuit;

controlling charging or discharging of each battery unit when the operating state of each battery unit is in a resting state, comprising:
  acquiring an absolute value of a voltage drop between the second battery unit and the other battery units;
  enabling the designated charging circuit if the absolute value of the voltage drop is greater than or equal to a threshold value for the voltage drop, so as to achieve a voltage balance between the second battery unit and the other battery units through the designated charging circuit; or
  turning on a charge switch of each of the branches in which the battery units locate and turning on a discharge switch of each of the branches in which the battery units locate if the absolute value of the voltage drop is smaller than the threshold value for the voltage drop, so as to achieve a voltage balance between the second battery unit and the other battery units through a connected parallel circuit.

2. The method of claim 1, wherein each of the branches in which the battery units locate is connected with a charge switch and a discharge switch;
  controlling charging or discharging of each battery unit when the operating state of each battery unit is in a charging state, comprising:
    turning on a charge switch of each of the branches in which the battery units locate and truing off a discharge switch of each of the branches in which the battery units locate; and
  controlling charging or discharging of each battery unit when the operating state of each battery unit is in a discharging state, comprising:
    turning on a discharge switch of each of the branches in which the battery units locate and truing off a charge switch of each of the branches in which the battery units locate.

3. A device for voltage balance, comprising:
  a generating unit to generate a control signal for charging or discharging of each battery unit in accordance with an operating state of each battery unit, after a first battery unit in a plurality of parallel battery units is replaced with a second battery unit; and
  a transmitting unit to transmit the control signal to each battery unit to enable to control charging or discharging of each battery unit,
  wherein each of the branches in which the battery units locate is connected with a charge switch and a discharge switch, and the battery units are connected to each other through a designated charging circuit;
  when the operating state of each battery unit is in a resting state, the generating unit is to:
    acquire an absolute value of a voltage drop between the second battery unit and the other battery units; and
    generate an enable control signal for instructing the enabling of the designated charging circuit, if the absolute value of the voltage drop is greater than or equal to a threshold value for the voltage drop; or
    generate a third turn-on control signal for instructing the turning on of a charge switch of each of the branches in which the battery units locate and the turning on of a discharge switch of each of the branches in which the battery units locate, if the absolute value of the voltage drop is smaller than the threshold value for the voltage drop;
  the transmitting unit is further to:
    transmit the enable control signal to the designated charging circuit, so as to achieve a voltage balance between the second battery unit and the other battery units through the designated charging circuit; or
    transmit the third turn-on control signal to the charge switch of each of the branches in which the battery units locate, and to the discharge switch of each of the branches in which the battery units locate, so as to achieve a voltage balance between the second battery unit and the other battery units through a connected parallel circuit.

4. The device of claim 3, wherein each of the branches in which the battery units locate is connected with a charge switch and a discharge switch;
  when the operating state of each battery unit is in a charging state, the generating unit is to: generate a first turn-on control signal for instructing the turning on of a charge switch of each of the branches in which the battery units locate, and a first turn-off control signal for instructing the turning off of a discharge switch of each of the branches in which the battery units locate; and
  the transmitting unit is further to transmit the first turn-on control signal to the charge switch of each of the branches in which the battery units locate and transmit the first turn-off control signal to the discharge switch of each of the branches in which the battery units locate.

5. The device of claim 3, wherein each of the branches in which the battery units locate is connected with a charge switch and a discharge switch;
  when the operating state of each battery unit is in a discharging state, the generating unit is to: generate a second turn-on control signal for instructing the turning on of a discharge switch of each of the branches in which the battery units locate, and a second turn-off control signal for instructing the turning off of a charge switch of each of the branches in which the battery units locate; and
  the transmitting unit is further to transmit the second turn-on control signal to a discharge switch of each of the branches in which the battery units locate and transmit the second turn-off control signal to the charge switch of each of the branches in which the battery units locate.

* * * * *